(12) United States Patent  (10) Patent No.: US 7,175,287 B2
Gohman  (45) Date of Patent: *Feb. 13, 2007

(54) WIDE ANGLE PROJECTION LENS

(75) Inventor: Jeffrey A. Gohman, Hillsboro, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/825,837

(22) Filed: Apr. 15, 2004

(65) Prior Publication Data

US 2004/0233394 A1  Nov. 25, 2004

Related U.S. Application Data

(63) Continuation-in-part of application No. 10/754,093, filed on Jan. 6, 2004, and a continuation-in-part of application No. 10/222,083, filed on Aug. 16, 2002, now Pat. No. 6,896,375, and a continuation-in-part of application No. 10/222,050, filed on Aug. 16, 2002.

(51) Int. Cl.
*G03B 21/14* (2006.01)
*G03B 21/28* (2006.01)
*G02F 1/1335* (2006.01)

(52) U.S. Cl. .......................... 353/79; 353/69; 353/122; 348/747; 349/57

(58) Field of Classification Search .................. 353/69, 353/70, 37, 81, 98, 99, 119, 122, 79; 348/756, 348/832, 781–783, 747; 349/57
See application file for complete search history.

(56) References Cited

U.S. PATENT DOCUMENTS 3,485,165 A  12/1969  Hughes
3,712,707 A  1/1973  Henkes, Jr.
4,674,836 A  6/1987  Yata et al. ................... 359/457
4,729,631 A  3/1988  Takahashi et al. .......... 359/456
4,730,897 A  3/1988  McKechnie et al.
4,773,731 A  9/1988  Goldenberg et al.
4,880,292 A  11/1989  Kageyama et al. ......... 359/457

(Continued)

FOREIGN PATENT DOCUMENTS

JP  2989947  5/1993

OTHER PUBLICATIONS

H. Kanayama et al., "A New LC Rear-Projection Display Based on the Aspherical Mirror Projection System," IDW, 2000, pp. 1041-1044, Sanyo Electric Co., Ltd., Osaka Japan.

(Continued)

*Primary Examiner*—Melissa Jan Koval
*Assistant Examiner*—Andrew Sever
(74) *Attorney, Agent, or Firm*—Alleman Hall McCoy Russell & Tuttle LLP (57) ABSTRACT

A projection display device is provided. The projection display device may include an image generation device configured to generate an image and a wide angle lens system having an optical axis configured to receive the image and project the image along an optical path for display above the display device. The projection display device further may include direction changing optics configured to fold the optical path such that the optical path changes direction from a first direction to a second direction. In some embodiments, the image generation device may be positioned below the optical axis of the wide angle lens system.

20 Claims, 4 Drawing Sheets

U.S. PATENT DOCUMENTS

| | | | |
|---|---|---|---|
| 4,921,330 A | 5/1990 | Takahashi et al. | |
| 4,927,248 A | 5/1990 | Sakakibara et al. | |
| 4,936,657 A | 6/1990 | Tejima et al. | 349/7 |
| 4,979,801 A | 12/1990 | Park | |
| RE33,795 E | 1/1992 | Ogino | |
| 5,100,222 A | 3/1992 | Minoura et al. | 359/455 |
| 5,302,983 A | 4/1994 | Sato et al. | 353/69 |
| 5,422,691 A | 6/1995 | Ninomiya et al. | 353/69 |
| 5,442,413 A | 8/1995 | Tejima et al. | 353/69 |
| 5,442,484 A | 8/1995 | Shikawa | |
| 5,489,940 A | 2/1996 | Richardson et al. | 348/315 |
| 5,495,306 A | 2/1996 | Shibazaki | 353/99 |
| 5,500,747 A * | 3/1996 | Tanide et al. | 349/5 |
| 5,642,927 A * | 7/1997 | Booth et al. | 353/119 |
| 5,699,131 A | 12/1997 | Aoki et al. | |
| 5,710,668 A | 1/1998 | Gohman et al. | 359/634 |
| 5,716,118 A | 2/1998 | Sato et al. | 353/98 |
| 5,724,195 A | 3/1998 | Enomoto et al. | 359/752 |
| 5,760,973 A | 6/1998 | Kawamura | 359/753 |
| 5,796,528 A | 8/1998 | Mihara | 359/753 |
| 5,805,359 A | 9/1998 | Yamanashi | 359/753 |
| 5,818,639 A | 10/1998 | Furuya | |
| 5,820,240 A | 10/1998 | Ohzawa | 353/70 |
| 5,833,339 A | 11/1998 | Sarayeddine | 353/20 |
| 5,870,234 A | 2/1999 | Ebbesmeier nee Schitthof | 359/752 |
| 5,923,479 A | 7/1999 | Nagata | 359/740 |
| 5,978,051 A | 11/1999 | Gohman et al. | 348/766 |
| 5,999,332 A | 12/1999 | Ohno | 359/692 |
| 6,016,229 A | 1/2000 | Suzuki | 359/784 |
| 6,018,425 A | 1/2000 | Nakabayashi et al. | 359/753 |
| 6,038,085 A | 3/2000 | Nakazawa | 359/753 |
| 6,046,859 A | 4/2000 | Raj | 359/649 |
| 6,052,226 A | 4/2000 | Takahashi | |
| 6,053,615 A | 4/2000 | Peterson et al. | 353/20 |
| 6,081,380 A | 6/2000 | Ohshima et al. | 359/599 |
| 6,084,707 A | 7/2000 | Maruyama et al. | |
| 6,088,172 A | 7/2000 | Sato | 359/770 |
| 6,111,701 A * | 8/2000 | Brown | 359/637 |
| 6,123,425 A | 9/2000 | Ohzawa | 353/69 |
| 6,129,552 A | 10/2000 | Deshoux et al. | |
| 6,137,638 A | 10/2000 | Yamagishi et al. | 359/682 |
| 6,144,503 A * | 11/2000 | Sugano | 359/749 |
| 6,147,812 A | 11/2000 | Narimatsu et al. | 359/691 |
| 6,188,523 B1 * | 2/2001 | Choi | 359/649 |
| 6,201,647 B1 | 3/2001 | Ohzawa | 359/631 |
| 6,236,511 B1 | 5/2001 | Brown | 359/634 |
| 6,273,338 B1 | 8/2001 | White | 235/462.42 |
| 6,299,313 B1 | 10/2001 | Hirata et al. | 353/54 |
| 6,301,058 B2 | 10/2001 | Nagahara | 359/650 |
| 6,307,675 B1 | 10/2001 | Abe et al. | |
| 6,348,993 B1 | 2/2002 | Hori | |
| 6,353,509 B1 | 3/2002 | Nakazawa | 359/761 |
| 6,366,400 B1 | 4/2002 | Ohzawa | 359/434 |
| 6,384,987 B1 | 5/2002 | Sensui | 359/753 |
| 6,396,641 B2 | 5/2002 | Hirata et al. | 359/649 |
| 6,400,504 B2 | 6/2002 | Miyata | |
| 6,406,150 B1 | 6/2002 | Burstyn | 353/69 |
| 6,407,859 B1 | 6/2002 | Hennen et al. | |
| 6,407,860 B1 | 6/2002 | Funazaki et al. | 359/457 |
| 6,416,181 B1 | 7/2002 | Kessler et al. | |
| 6,417,966 B1 | 7/2002 | Moshrefzadeh et al. | |
| 6,419,365 B1 | 7/2002 | Potekev et al. | 353/98 |
| 6,471,359 B1 | 10/2002 | Kim et al. | |
| 6,473,236 B2 * | 10/2002 | Tadic-Galeb et al. | 359/618 |
| 6,485,145 B1 * | 11/2002 | Cotton et al. | 353/69 |
| 6,493,032 B1 * | 12/2002 | Wallerstein et al. | 348/335 |
| 6,513,935 B2 | 2/2003 | Ogawa | 353/37 |
| 6,561,649 B1 | 5/2003 | Burstyn | 353/8 |
| 6,624,952 B2 * | 9/2003 | Kuwa et al. | 359/726 |
| 6,626,541 B2 | 9/2003 | Sunaga | |
| 6,652,104 B2 * | 11/2003 | Nishida et al. | 353/70 |
| 6,752,500 B1 | 6/2004 | Yoshii et al. | |
| 6,768,594 B2 | 7/2004 | Imafuku et al. | 359/649 |
| 6,788,460 B2 | 9/2004 | Knox et al. | |
| 6,804,055 B2 | 10/2004 | Peterson et al. | |
| 6,808,271 B1 | 10/2004 | Kurematsu | |
| 6,813,094 B2 | 11/2004 | Kaminsky et al. | |
| 6,853,493 B2 | 2/2005 | Kreitzer | |
| 6,877,862 B2 | 4/2005 | Fukunaga et al. | |
| 6,880,934 B2 | 4/2005 | Lee | |
| 6,883,920 B2 | 4/2005 | Chen | |
| 2002/0008853 A1 | 1/2002 | Sunaga | 353/69 |
| 2002/0044263 A1 | 4/2002 | Takeuchi | 353/69 |
| 2003/0025885 A1 | 2/2003 | Cotton et al. | 353/69 |
| 2003/0038999 A1 | 2/2003 | Knox et al. | |
| 2003/0053206 A1 | 3/2003 | Togino | |
| 2003/0169513 A1 | 9/2003 | Kaminsky et al. | |
| 2003/0231261 A1 | 12/2003 | Bassi et al. | 348/745 |
| 2004/0001254 A1 | 1/2004 | Shimizu | 359/449 |
| 2004/0227990 A1 * | 11/2004 | Peterson et al. | 359/457 |

OTHER PUBLICATIONS

J. Ouellette, "Digital Displays with Micromirror Devices," American Institute of Physics, Jun. 1997, pp. 9-11.

J. Shinozaki, et al. "15.3: A 50-in. Ultra-Slim Liquid-Crystal Rear Projector," SID 92 Digest, 1992, pp. 273-276, Seiko Epson Corp., Tokyo, Japan.

* cited by examiner

WIDE ANGLE PROJECTION LENS

CROSS-REFERENCE TO RELATED APPLICATIONS

The present application is a continuation-in-part of Ser. No. 10/754,093, which was filed on Jan. 6, 2004, and is a continuation-in-part of Ser. No. 10/222,083, which was filed on Aug. 16, 2002, now U.S. Pat. No. 6,896,375 and is a continuation-in-part of Ser. No. 10/222,050, which was filed on Aug. 16, 2002, the entire contents of each being incorporated herein by reference in their entirety for all purposes.

FIELD OF INVENTION

The embodiments of the present disclosure relate generally to image display devices, and more particularly, to a lens for a projection device.

BRIEF DESCRIPTION OF THE DRAWINGS

Various aspects of the invention are illustrated by way of example and not by way of limitation in the figures of the accompanying drawings, in which the like references indicate similar elements and in which.

DETAILED DESCRIPTION

Figure 1:
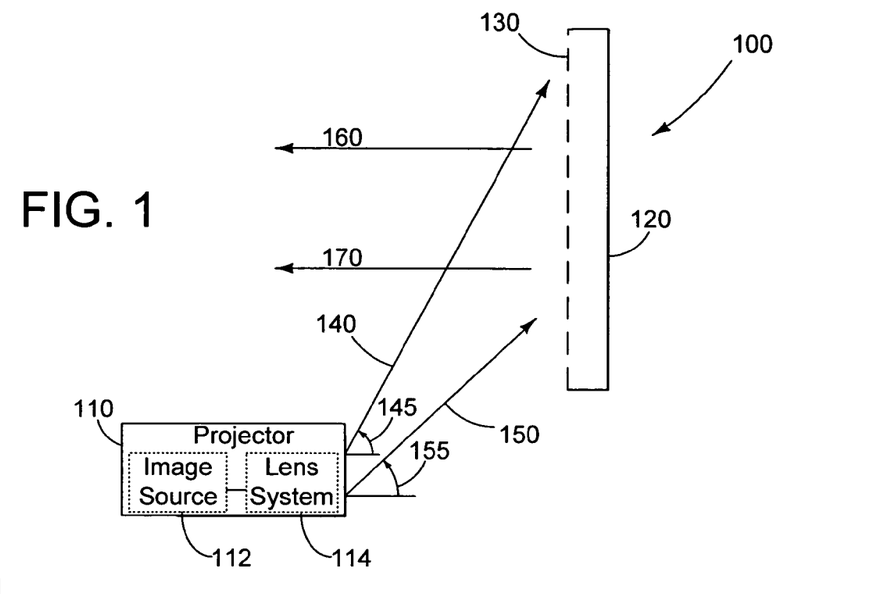
FIG. 1 is a schematic illustration of a front projection display system according to an embodiment of the present disclosure.

FIG. 1 illustrates schematically, at 100, a front projection display system. Front projection display device may include a display device, such as a projector 110, and a viewing surface, such as a screen 120. Screen 120 may include a screen surface 130. Projector 110 may be configured to generate an image and to project the image on screen surface 130. The screen 120 may reflect the projected image and direct it toward a viewer (not shown). In some embodiments, screen surface 130 may scatter light so that the projected image is visible to the viewer. Although shown and described in relation to a front projection device where the image displayed is on the same side as the projection device, it should be appreciated that the present disclosure may be applicable to rear projection devices.

Briefly, projector 110 may include a light source and/or image source, as generally indicated at 112. The image source 1 12 may include image-generation devices, including, but not limited to, digital micromirror devices (DMD), microelectromechanical systems (MEMS), grating light valve devices (GLV), liquid crystal display devices (LCD), liquid crystal on silicon devices (LCOS), etc.

Projector 110 further may include a lens system 114 which may be integrated within projector 110 or otherwise coupled to projector 110 such that an image generated by the light source or image source is projected to a screen surface 130 as indicated by arrows 140, 150. The image may be displayed to a viewer as indicated by arrows 160, 170.

Screen 120 may be configured to reflect the projected image and direct it towards a viewer. In some embodiments, screen surface 130 may include various surface features to improve display of the image to a viewer. For example, screen surface 130 may be any suitable image display surface, including, but not limited to a wall, a coated surface or other specialized surface, such as a glass-bead screen surface, a bumpy screen surface, etc. It should be appreciated that in some embodiments, screen 120 may be a Fresnel lens type screen, however other suitable screens or surfaces, such as a wall or other suitable viewing surface, may be used.

Returning to FIG. 1, projector 110 may be configured to project light at a steep angle from the horizontal to screen surface 130 of screen 120. For example, projector 110 may be offset from screen 120 such that light is projected onto screen surface 130 at a substantially steep angle. For example, in some embodiments, light may be projected at an angle between approximately 30 to 80 degrees from the horizontal. It should be appreciated that in other embodiments, the light may be projected to screen surface 130 at other angles, including but not limited to angles between 20 to 90 degrees or angles there between. The angle of reflection may vary along screen surface 130.

Rays 140 and 150 illustrate exemplary paths that light may travel from projector 110 to screen 120. For exemplary purposes only, ray 140 is shown reflecting and diffusing off of screen surface 130 at an angle 145. Angle 145 may be any suitable angle, such as an 80-degree angle. Similarly, ray 150 is shown reflecting off of the screen at angle 155. Angle 155 may be any suitable angle, for example angle 155 may be a 30-degree angle. Rays 160 and 170 illustrate the path that light may travel after reflecting off of screen 120. Rays 160 and 170 show the image being reflected to a viewer (not shown).

In one embodiment of the present disclosure, projector 110 may include a wide-angle lens system. In one exemplary wide angle lens system, illustrated schematically in FIG. 2 at 200, the wide angle lens system may include a relay lens stage 210 and a wide angle lens stage 220. Relay lens stage 210 may be configured to generate and project an intermediate image 230 to wide angle lens stage 220. Wide angle lens stage 220 may be configured to generate and project corrected image 240 for display to screen 250 (which can include screen 120, for example).

Figure 2:
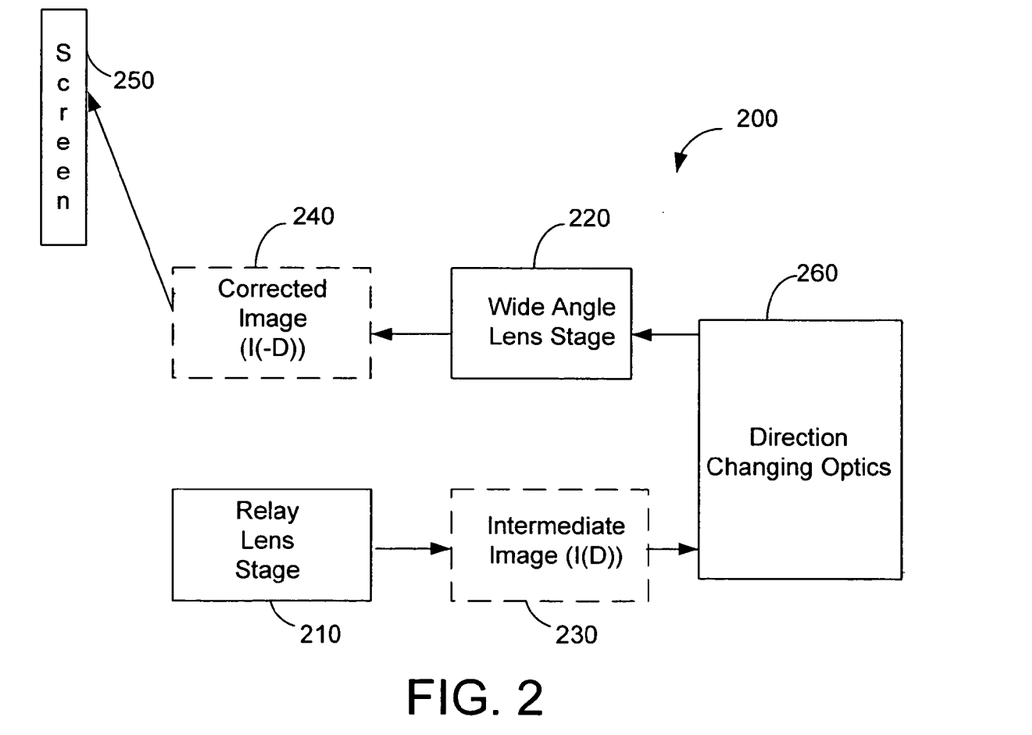
FIG. 2 is a block diagram of a lens system that may be used in the front projection display system of FIG. 1 according to an embodiment of the present disclosure.

Intermediate image 230 may be considered a distorted image (I(D)) such that wide angle lens stage 220 receives a predistorted image. The distortion caused by wide angle lens stage 220 may be such that the distortion of intermediate image 230 is substantially compensated for (substantially cancelled) by wide angle lens stage 220 to generate image (I(-D)). The reference (I(-D)) is intended to indicate an image substantially without the distortion of the intermediate image 230. It should be appreciated that the distortion may be to the image shape and/or the focal plane.

For purposes of the present description, the term "distortion," is intended to include any change from the initial image inputted into the predistortion system. For example, in some embodiments, a distortion in the image may include an alteration in the shape of at least a portion of the image. The term "predistortion" is intended to include an intentional distortion of an optical image that compensates for (i.e. is substantially equal and opposite to) distortion generated by wide angle lens stage 220. It will be appreciated that the predistorted image may be presented in a variety of different configurations depending on the type of downstream distortion for which the predistorted image is intended to compensate.

The system described in FIG. 2 may include additional optics to direct the image along a desired image or light path. For example, the system may include one or more direction changing optics, such as those indicated at 260. Such direction changing optics, 260 may be configured to direct an image along a desired light path. Direction changing optics 260 may be any suitable optical devices, including, but not limited to mirrors, prisms, etc. which are adapted to redirect light in a preselected direction. For example, direction changing optics 260 may alter the light path by any suitable angle, such as, but not limited to 30°, 60°, 90°, 120°, 180°, 210°, etc. Direction changing optics 260 may include one or more optical elements. For example, direction changing optics may include a set of two 90 degree fold mirrors, one, two or three prisms, a combination of mirrors and prisms, etc.

In the illustrated embodiment of FIG. 2, the light path is shown changing directions 180 degrees from the initial light output from the relay lens stage. Thus, the intermediate image is directed along an optical path that changes direction by substantially 180 degrees prior to entering the wide angle lens stage. For example, the direction of the input light is substantially opposite the direction of the light output to the display or screen. Although direction changing optics 260 are shown interposed the relay lens stage 210 and wide angle lens stage 220, such direction changing optics 260 may be incorporated within relay lens stage 210 or wide angle lens stage 220. Alternatively, and or additionally, such direction changing optics may be prior to or subsequent to either one or both of relay lens stage 210 or wide angle lens stage 220.

It should be appreciated that there may be additional optics within the light path which are configured to further direct the light and/or alter the image. For example, a second relay lens stage may be used to direct the light to wide angle lens stage 220. Moreover, there may be one or more lenses or stages configured to alter the intermediate image Or the corrected image.

Figure 3:
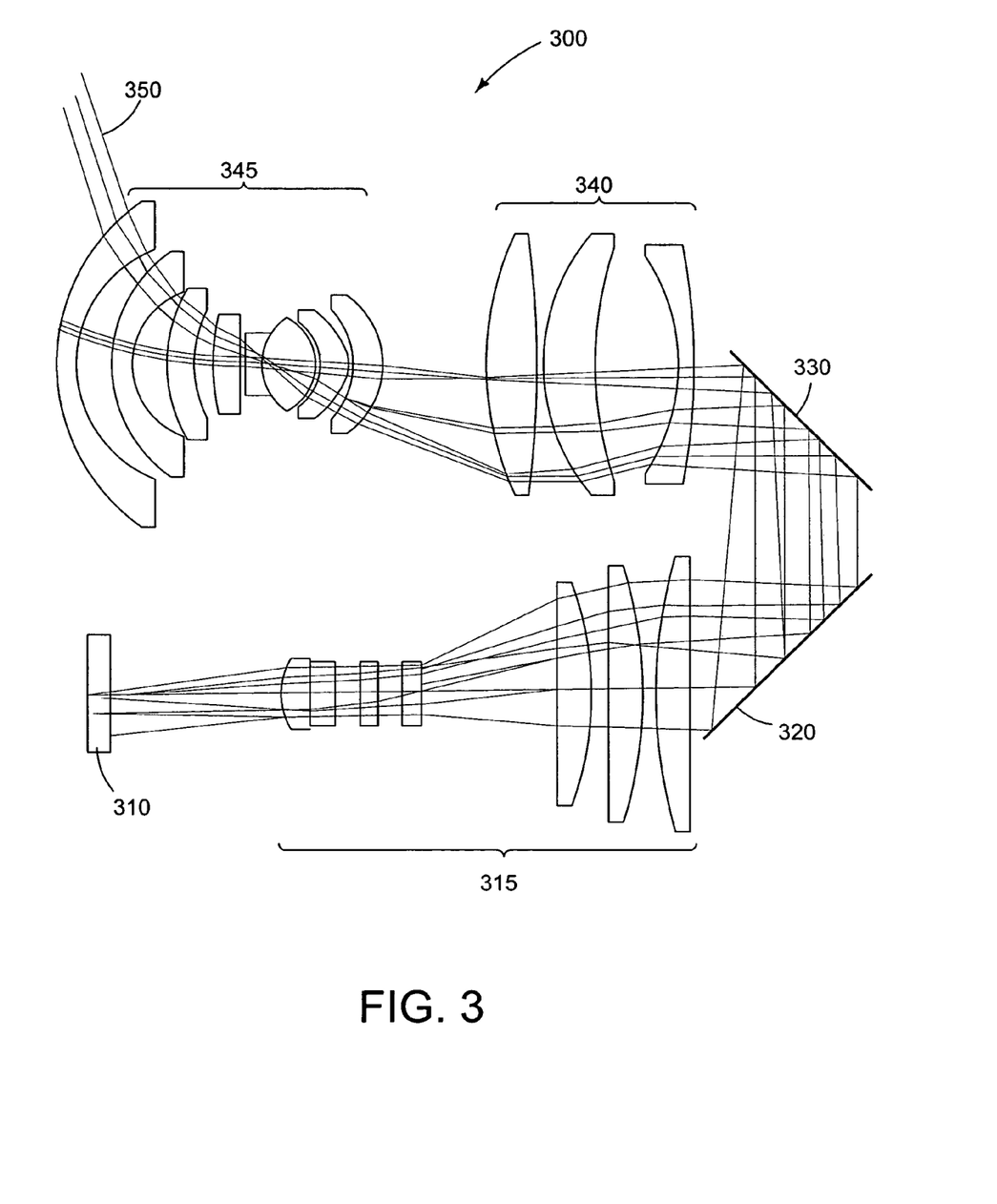
FIG. 3 is a schematic illustration of a lens system that may be used in the front projection display system of FIG. 1 according to an embodiment of the present disclosure.

FIG. 3 is a schematic illustration of an exemplary lens system, indicated generally at 300, which may be used in the display system of FIG. 1. As illustrated, the system may include an image-generation device, e.g. DMD 310, adapted to provide an image to the lens system. An image can be provided to DMD 310 in any manner known in the art. DMD 310 may be configured to selectively reflect light from any suitable light source (not shown) to the lens system. Other types of devices (e.g., microelectromechanical systems (MEMS), grating light valve (GLV), liquid crystal display (LCD), liquid crystal on silicon (LCOS), etc.) may be used to provide an image to the lens system.

In the exemplary lens system 300, the image path includes multiple folds. Specifically, the image path is directed through a first relay lens stage 315, through direction-changing optics 320 and 330 to a second relay lens stage 340, and then to a wide angle lens system, including a wide angle lens stage or group 345. In some embodiments, second relay lens stage 340 may be part of wide angle lens stage 345. In the illustrated configuration, light (the image path) is redirected from a first input direction through first relay lens stage 315 to a second output direction through wide angle lens stage 345.

Any suitable optical arrangement may be used to change the direction of light. In the exemplary embodiment, planar direction changing elements 320, 330, such as two fold mirrors or prisms, may be used so that the direction of light is changed or turned by approximately 180 degrees. Specifically, each element 320 and 330 may provide an approximately 90° fold of the image path. In alternative embodiments, the two fold angles may be different from each other, but still produce an approximately 180 degree change in the image path. The multiple fold arrangement may be adapted to reverse the light direction such that output light is redirected substantially back toward the direction that the input light entered the system (albeit different horizontal planes). Such a configuration may make the lens system substantially compact such that the device may require less space and be contained within a small package or enclosure. Other optical devices and number of folds of the image path may be used without departing from the scope of the invention. For example, other combinations of prisms and/or mirrors may be used to alter the image direction 180 degrees or more. Moreover, the fold is not required. Alternatively, or additionally, other fold angles, for example, 45°, 30°, 135°, 180°, etc. could be used.

Lens system 300 in FIG. 3 may be configured to produce a distorted intermediate image as described in relation to FIG. 2. The distortion of the intermediate image may be substantially corrected using wide angle lens stage 345 which may produce distortion substantially equal and opposite to the distortion of the intermediate image, thus canceling the distortion of the intermediate image. In some embodiments, the distortion of the intermediate image may be created by the use of a relay lens stage, such as one of or both of the first and second relay lens stages 315, 340.

Each of these lens systems may be considered to have a predistortion system, such as the first relay lens stage and/or the second relay lens stage (315, 340), which is configured to create a predistorted image (or intermediate image) from an original image. The lens systems may further be understood to have a receiving projection system, such as the wide angle lens system 345, which is configured to receive the predistorted image and distort the image to substantially cancel the predistortion of the predistorted image and to project a substantially non-distorted image corresponding to the original image.

Still referring to FIG. 3, in one embodiment, lens stages 315 and 340 may include any number of suitable lenses, based on, for example, the desired distortion of the intermediate image, or the overall size of the lens system. The distortion to be caused by relay lens stages 315 and 340 may be substantially equal and opposite the distortion caused by wide angle lens stage 345. In one embodiment, the intermediate image is approximately a half circle image in a warped image plane. In alternate embodiments, other types of distortion may be used. For example, if the full lens field is to be used, the distorted intermediate image may be a generally circular image. The image plane may or may not be warped.

Wide angle lens stage 345 projects the distorted intermediate image to a screen for display. Because wide angle lens stage 345 causes distortion to the image to be projected and the intermediate image has been pre-distorted by relay lens stages 315 and 340, the resulting image projected by the lens system has little or no distortion.

In some embodiments, the lens system may be configured to direct the image to a screen at a steep angle. For example, the lens system may be configured to direct the light at an angle of approximately 30 to 80 degrees toward a screen.

The light may impinge the screen on a first side and be redirected back toward a viewer on the same side (first side) of the screen. In this example, by using multiple folds, a compact and lightweight projection device may be produced.

In one embodiment, the optic axes of the lenses of relay lens stage 315 may be aligned. Similarly, the optic axes of the lenses of wide angle lens stage 345 also may be aligned. In an alternative embodiment, DMD 310 is offset from the optic axis of lens stages 315 and/or 340 such that only a portion (e.g., between 90% and 80%, 80%–70%, 70%–60%, 60%–50%, 50%–40%, 40%–30%, 30%–20%, 20%–10%, 80%–40%, 40%–10%, or there between) of the available lens field is used. By offsetting DMD 310 with respect to the optic axis of lens stages, the image from DMD 310 may be projected by lens stages 315, 340, and/or 345 in the upper portion of the lens field to the screen. Alternatively, a lower portion of the lens field may be used to project an image to the screen, if desired.

Typically, wide angle lens stage 345 provides a field angle of greater than 100°. For example, lens stage 345 can have a field angle of 152° or more. It should be understood that lenses having greater or lesser field angles also may be used. For example, the field angle can also be 130° or more. In one embodiment, the field angle is 153°; however, other angles can be provided. In some embodiments, the optical axis of wide angle lens stage 345 is substantially perpendicular to the screen so that keystone, or trapezoidal distortion may be reduced.

As described above, the image may be projected to a screen. In some embodiments, the screen may be a portion of a Fresnel lens type screen. In one embodiment, a Fresnel lens type screen with multiple concentric grooves having one or more predetermined groove angles may be used. Further, there may be regions or zones with different groove angles, pitches, or groove depths. The Fresnel lens type screen can be designed to accommodate light received from a steep angle, such as in the system shown in FIG. 1. It should be noted that the angle of the grooves and the reflection angle may vary to accommodate the angle of the input light.

Other types of screen surfaces and screens may be used to accommodate a steep angle projector as shown in FIG. 1. For example, the screen may be a lenticular screen, a single-sided Fresnel lens type screen, a linear prism sheet, a double-sided lenticular screen, a glass bead screen, etc. Each of the above screens may be configured to receive light from a steep angle, such as from the wide-angle lens system 300 described above. Each screen may further be configured with surface topographies that are adapted to reflect light back to a viewer along a horizontal plane or other suitable viewing plane. Moreover, such screens may include surface topographies configured to reduce stray ambient light, which may substantially effect production of the image.

Figure 4:
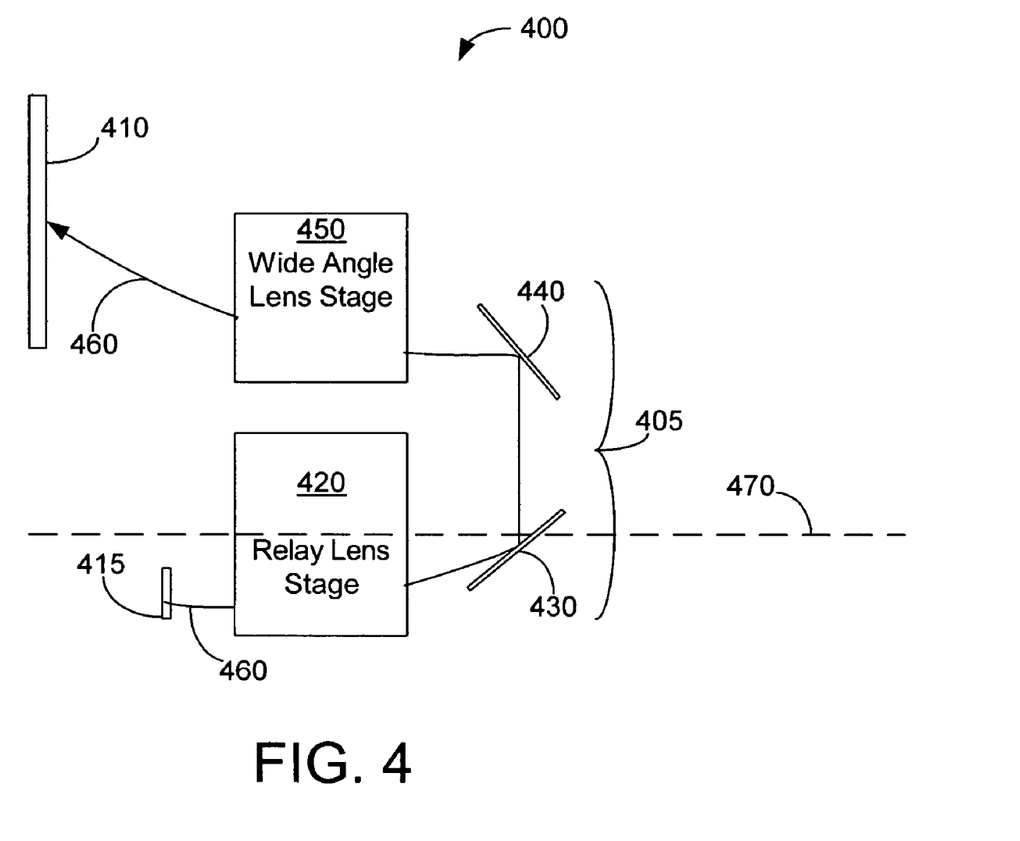
FIG. 4 is a schematic illustration of a front projection display system with a display device in an offset down position according to an embodiment of the present disclosure.

FIG. 4 provides a schematic illustration of a front projection display system, indicated generally at 400, with the display system 400 in an offset down position according to an embodiment of the present disclosure. Specifically, front projection display system may include a display device 405 and a screen 410. Display device 405 may include, but is not limited to, an image generation device 415 (such as a DMD, DLP, LCD, LCOS, etc.), and a lens system. The lens system may be any suitable lens system such as, but not limited to, the lens system illustrated and described in relation to FIG. 3. For example, the lens system may include a relay lens stage 420, direction changing optics 430, 440 and a Wide angle lens stage 450. As discussed above, image generation device 415 may generate an image and direct the image along an image path or light path 460. Direction changing optics 430, 440 may redirect the image path such that the light direction is reversed from a first direction to a second direction. The second direction may be substantially opposite the first direction.

In some embodiments, relay lens stage 420 may be positioned on a plane below wide angle lens stage 450. For example, wide angle lens stage 450 may be substantially disposed in a first plane and relay lens stage 420 substantially disposed in a second plane. In such an embodiment, the first plane of wide angle lens stage 450 may be above the second plane of relay lens stage 420, as shown in FIG. 4. Moreover, it should be considered that the optical axis of relay lens stage 420 may be below the optical axis of wide angle lens stage 450.

Desired viewing level of an image on a screen 410 typically requires that the image be projected above the plane or the optical axis 470 of the lens of the display device. In such a configuration, one may consider the image offset in an "offset up" position. Image offset, as used herein, is the position of the projected image relative to the optical axis of the lenses of the display device.

The configuration of the lens system including relay lens stage 420 and wide angle lens stage 450 may enable the image offset to be offset up as desired. In prior systems, offsetting the image up required positioning the display device (specifically the image generation device) above the optical axis. In other words, the display device (and specifically the image generation device) had to be "offset up." This configuration was due to the production of the intermediate image within the system. Without folding or otherwise altering the image path, a display device with an offset down would result in an image offset down. Thus, such systems required the offset of the display device to be up to ensure an image offset up.

However, it may be desired to have the offset of the display device (specifically the image generation device) below the optical axis of the lens system or "offset down." The offset down position of the display device may be desired due to the type or operation of the image generation device. The present configuration of the display device enables the display device to be offset down. For example, in the present configuration, the image generation device 415 may be positioned below optical axis 470. Due to direction changing optics 430 and 440, the image path 460 is folded and the image path direction substantially reversed. Such folding and reversing of the image path enables the offset of the image-generation device to be down (below the optical axis 470 of the display device) while still maintaining an image offset up (above the optical axis of the display device).

Thus, as described above, in some embodiments, a projection display device may be provided including an image generation device configured to generate an image. The projection display device further may include a wide angle lens system (Which may include a relay lens stage and a wide angle lens stage) having an optical axis. The wide angle lens system may be configured to receive the image and project the image along an optical path for display above the display device. The projection display device further may include direction changing optics configured to fold the optical path such that the optical path changes direction from a first direction to a second direction. In some embodiments, the image generation device may be positioned below the optical axis of the wide angle lens system such that the offset of the image generation device is down, but the image offset is up. It should be noted that the optical axis of the wide angle lens system may be the optical axis of the relay lens stage, or in other embodiments, may be the optical axis of the wide angle lens stage.

It Should be appreciated that additional folds and changes in the image path may be used to obtain a desired image offset. Moreover, different types of direction-changing optics, such as, but not limited to, planar mirrors, prisms, etc., may be used to fold or otherwise alter the image path in order to ensure that the image offset is up and the display device is offset down.

Figure 5:
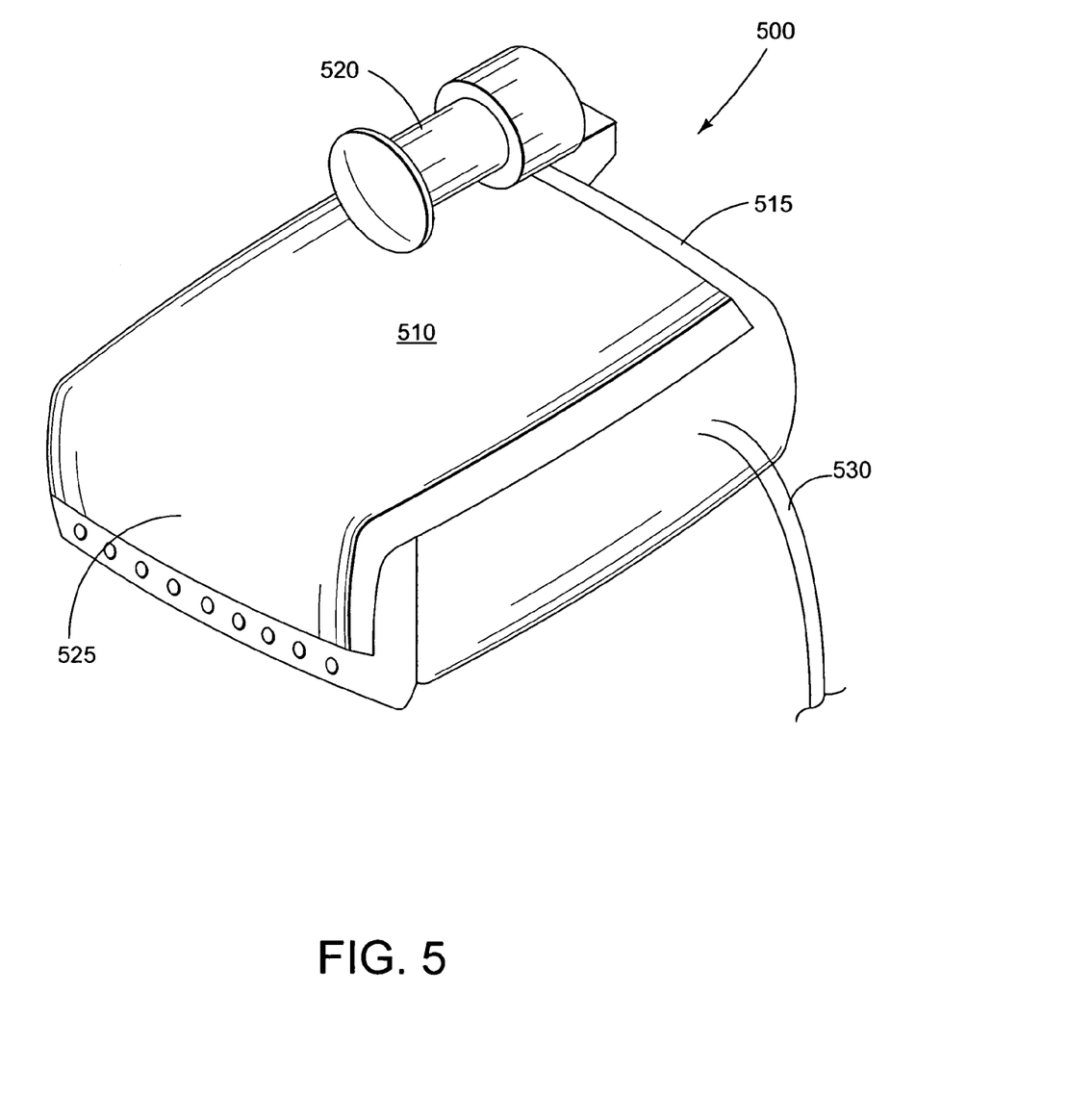
FIG. 5 illustrates a display device with the lens system shown in FIG. 3 according to an embodiment of the present disclosure.

FIG. 5 further illustrates, at 500, a projection system including a lens system 520 (such as the lens system discussed above in relation to FIGS. 3 and 4) coupled with a projector 510. As illustrated, lens system 520 may be coupled to projector 510. In some embodiments, lens system 520 may be removably coupled to projector 510. Alternatively, lens system 520 may be integrated into projector 510. By using the multiple fold system of FIGS. 3 and 4, the length of the lens may be decreased creating a more compact projector system.

Projector system 500 with lens system 520 may be configured to project an image at a steep angle to a screen or viewing surface. Such a projection system may thus require little space and may be easy to use in a wide variety of environments. In some cases, projector system 500 of FIG. 5 may be used in a person's home as a television, entertainment projector, theatre projector, etc. Alternatively the projection system 500 may be used in a business environment. In some embodiments, the system 500 may be integrated within a cabinet or other like device. In other embodiments, system 500 may be configured to be hung as a wall display, similar to a picture hanging on the wall. It should be appreciated that the configuration of the lens system (such as the system described in FIG. 3) may enable the body of the projector to be positioned substantially adjacent a display surface, e.g. a wall, a screen, or other suitable surface.

Lens system 520 may be configured to project an image back towards the rear of the projector. For example, lens system 520 may be configured to redirect the image path 180 degrees such that the image is first generated and directed toward the front of the projector (indicated at 515) and then redirected across the back of the body of the projector to a display surface disposed to the rear of the projector (indicated at 525). By positioning the projector body substantially adjacent the display surface, the shelf space required for the projection device may be reduced. Further, such a configuration spaces the lens system 520 a select distance from a display surface which may be adapted to receive the projected image. In some embodiment, the select distance (as defined by the size of the projector body) may substantially correlate to the minimum throw distance or a preferred throw distance of the lens system.

As briefly described above, the orientation of the lens system 520 relative to the projector 510 may enable the main body of the projector 510 to be positioned in close proximity to a wall. Such a configuration may reduce the shelf space required for the projector when in operation, while still providing a reduced throw distance for the lens system. For example, the projector 510 of FIG. 5 may be placed substantially next to a wall or display surface (e.g. within 2 to 10 inches from a wall or display surface) while producing a large image (e.g. a 50-inch to 100-inch image).

The ability to position an operable projection device substantially close to a viewing surface may operate to reduce shadows on the screen caused by movement of objects, e.g. people walking through the light path, or other objects that may be intermittently or permanently present in the light path. For example, in the described embodiment, the image display will not be interrupted by a presenter walking around the room, or audience members raising their hands, or other viewers moving throughout a presentation room. Since the image is thrown only a short distance, such movements and interruptions will not generate disruptive shadows in the image. Moreover, such a configuration may be used in systems such as those described below where the system may be easily stored and set up for use without having to repeatedly pack up and un-pack a projector.

The system 500 of FIG. 5 further may be adapted to offset the display device up as described in relation to FIG. 4. In contrast to some previous display systems, where the offset of the display device is down, and the displayed image is offset up above the plane of the projector, the present system is set such that the display device is offset up in order to make the image offset up. As described above, in some embodiments in the present system, the production of an intermediate image may require the display device to be offset up. By folding the lens and reversing the image path, the display device may be offset down (as may be desired) while still maintaining the image offset up.

Projector 510 may further include one or more cords (a single cord is shown for illustrative purposes at 530). Such cords may include, but are not limited to power cords, network cords, etc. As described above, projector 510 with lens system 520 may be configured to project an image to a substantially adjacent screen or wall surface. Thus, it may be possible to position projector 510 relatively close to a wall or other image surface. Specifically, as described above in relation to FIG. 3, the configuration of the lens system changes the direction of the light (which was previously directed away from the front of the projector after it exits the projection lens) such that the light is redirected toward the back of the projector. This configuration enables the projector to be positioned such that plugs, outlets, IO connectors, etc. on the back side of the projector may be positioned substantially adjacent the wall. Thus, in some embodiments, cord 530 may be easily received in a wall outlet substantially adjacent the projector. Unlike previous systems, where cords draped from a projector across the room to an outlet, the cords may instead run along the wall to a suitable outlet without presenting an obstacle to presenters and audience members in the room. Moreover, the proximity of the projector to the wall may enable shorter cords to be used with the system.

Although described above in regards to a front projection device, it should be appreciated that the lens system herein may be incorporated within a rear projection device and/or system. Thus, in some embodiments, lens system may be configured to project an image to a screen where the viewer is disposed on the same side of the screen as the projector, such as in a front projection system. In other embodiments, the lens system may be configured to project an image to a screen where viewer is on the opposing side of the screen from the projector, such as a rear projection system.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an"

element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment and such features, structures and/or characteristics may be included in various combinations with features, structures and/or characteristics of other embodiments.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A front projection apparatus, the apparatus comprising:
   an image generation device configured to generate an image formatted for display on a substantially planar surface;
   a wide angle lens system providing a field angle of at least 100° having an optical axis configured to receive the image and project the image along an optical path for planarly focused display on a substantially planar surface above the apparatus, and
   direction changing optics configured to fold the optical path such that the optical path changes direction from a first direction to a second direction, the image generation device is positioned below the optical axis of the wide angle lens system.

2. The apparatus of claim 1, wherein the wide angle lens system includes a relay lens stage and a wide angle lens stage.

3. The apparatus of claim 2, wherein the relay lens stage is configured to generate a distorted intermediate image and the wide angle lens stage is configured to substantially cancel the distortion of the intermediate image.

4. The apparatus of claim 2 wherein the optical axis of the wide angle lens system is the optical axis of the relay lens stage.

5. The apparatus of claim 2, wherein the wide angle lens stage is in a first plane and the relay lens stage is in a second plane, and the first plane is above the second plane.

6. The apparatus of claim 1, wherein the first direction is substantially the reverse of the second direction.

7. The apparatus of claim 1, wherein the first direction is toward a front of the projection display device and the second direction is toward a rear of the projection display device.

8. The apparatus of claim 1, wherein the direction changing optics include two fold mirrors.

9. A lens system for a front projection device, the system comprising:
   a relay lens stage configured to generate an intermediate image;
   a wide angle lens stage providing a field angle of at least 100° configured to substantially correct the intermediate image and project planarly focused image onto a substantially planar surface; and
   direction changing optics configured to receive the intermediate image from the relay lens stage from a first direction and redirect the intermediate image to the wide angle lens stage in a second direction, where the first direction is substantially opposite the second direction.

10. The lens system of claim 9, wherein the direction changing optics comprise at least one fold mirror.

11. The lens system of claim 9, wherein the relays lens stage is configured to generate a substantially distorted image and the wide angle lens stage is configured to substantially cancel the distortion of the intermediate image.

12. The lens system of claim 9, wherein the relay lens stage has a first optical axis and the wide angle lens stage has a second optical axis and where the first optical axis is oriented below the second optical axis.

13. A projection device comprising the lens system of claim 9.

14. The projection device of claim 13, comprising a body having a front and a rear, wherein the first direction is toward the front of the body and the second direction is toward the rear of the body.

15. The projection device of claim 14, wherein the body is substantially sized such that upon positioning the body substantially adjacent a viewing surface a minimum throw distance of the lens system is achieved to the viewing surface.

16. A front projection system for displaying a planarly focused image on a substantially planar display surface, the substantially planar display surface forming a display plane, the projection system comprising:
   a body having a front portion and a rear portion, wherein the rear portion of the projection system is disposed substantially adjacent the display plane;
   a lens system disposed in the body, where the lens system includes a relay lens stage, a wide angle lens stage having a field of at least 100° to project a planarly focused image, and direction changing optics interposed the relay lens stage and the wide angle lens stage to form an optical path, where the direction changing optics change the optical path direction from a first direction towards the front portion of the body to a second direction towards the substantially planar display surface.

17. The front projection system of claim 16, wherein the wide angle lens stage provides a field angle of greater than 100°.

18. The front projection system of claim 16, wherein the relay lens stage is disposed on a plane below the wide angle lens stage.

19. The front projection system of claim 16, wherein an image offset of the front projection system is in an image offset up position.

20. The front projection system of claim 16, wherein the projection system is offset down while an image offset is in an image offset up position.

* * * * *